Aug. 28, 1951 C. R. DE LORME 2,565,913
BROACHING MACHINE
Filed Sept. 15, 1945 2 Sheets-Sheet 2
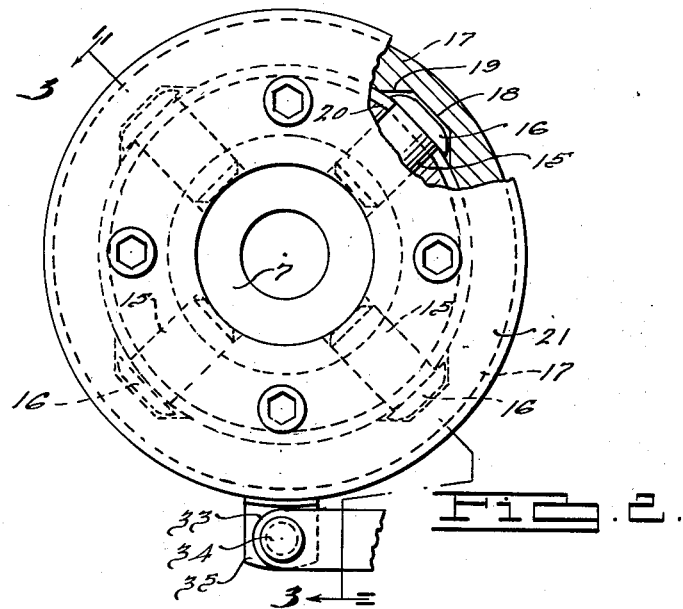
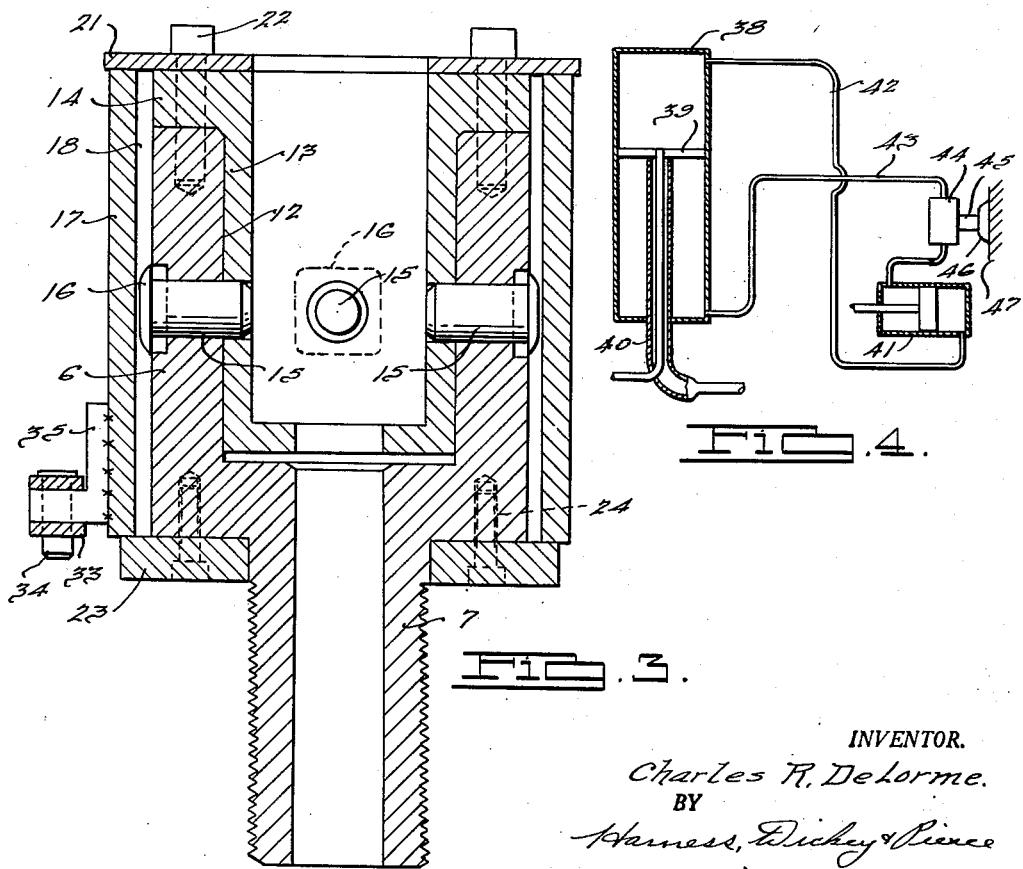
INVENTOR.
Charles R. DeLorme.
BY
Harness, Dickey & Pierce
ATTORNEYS.

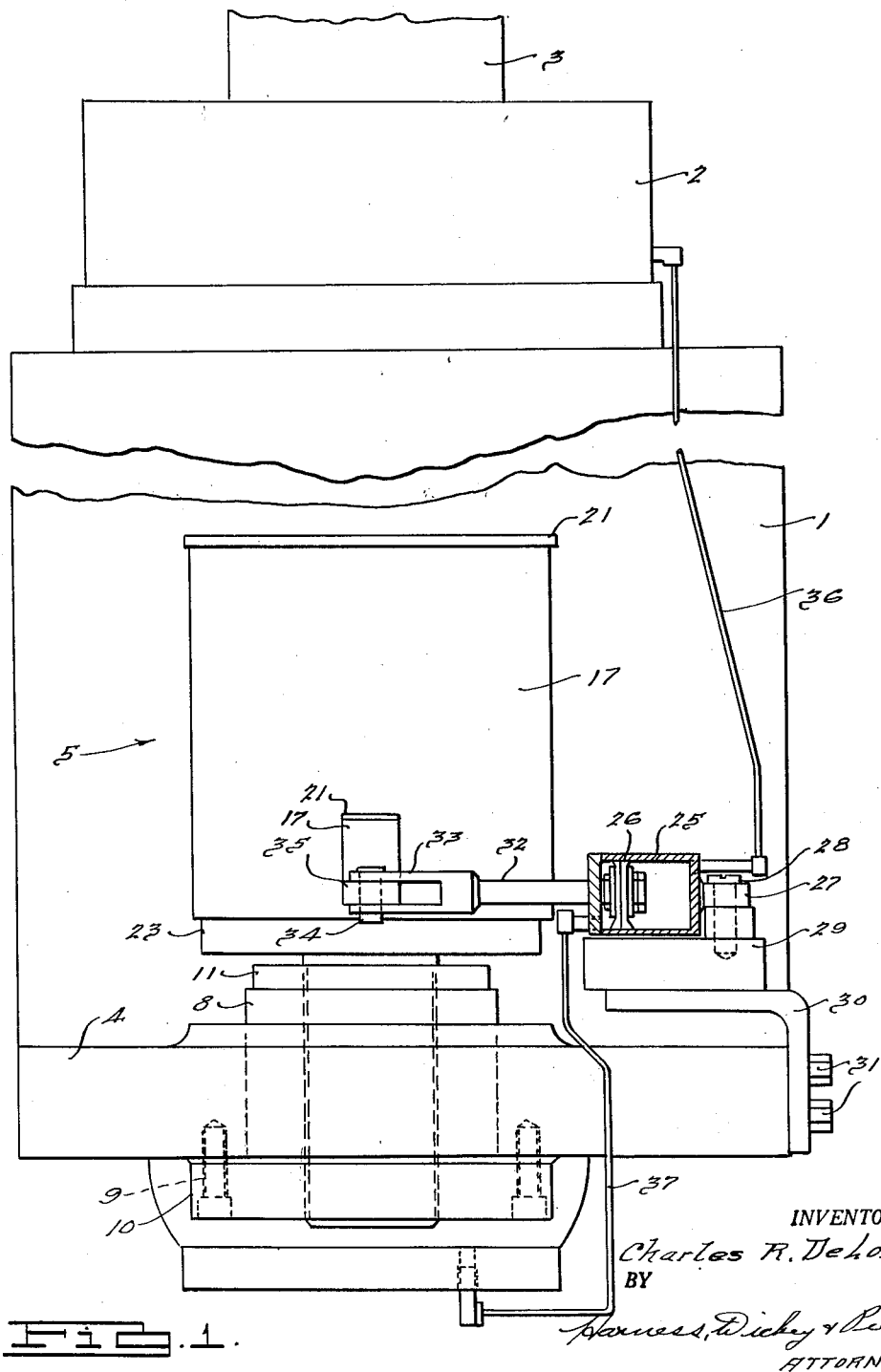

Patented Aug. 28, 1951

2,565,913

UNITED STATES PATENT OFFICE 2,565,913

BROACHING MACHINE

Charles R. De Lorme, Detroit, Mich., assignor to Colonial Broach Company, Detroit, Mich., a company of Delaware Application September 15, 1945, Serial No. 616,533

4 Claims. (Cl. 90—33)

The present invention relates to a pull broach machine and particularly to a novel arrangement of broach gripping and pulling mechanism.

In the past it has been conventional practice to employ in shuttle type pull broach machines a broach gripping and pulling chuck having an axially movable releasing sleeve which is normally held in locking position by one or more springs and which is released automatically at the end of the broach return stroke by engagement of the sleeve with a stationary abutment. While this form of construction has been successfully employed it is subject to a number of disadvantages. In the first place it requires a machine in which the slide at the end of its return movement stops in an accurately fixed position; secondly the axially movable releasing sleeve is liable to become clogged with chips or foreign material; and, finally, the chuck depends for its operation upon the action of springs which are subject to breakage. If for any reason the mechanism fails to operate, failure of operation of the machine or injury to the tool or work may result.

Accordingly, it is the object of the present invention to provide an improved form of broach gripping mechanism which is power operated in both directions and is so constructed that it cannot become clogged with chips or foreign material.

Another object of the invention is to provide a broach gripping mechanism which will require a shorter neck on the broach than prior mechanisms for the same purpose.

Another object of the invention is to provide simplified means for power operating the broach gripping mechanism in proper sequence with respect to the movements of the machine.

Other objects and advantages will become apparent from the following specification, the accompanying drawing, and the appended claims.

In the drawings,

Figure 1 is a fragmentary front elevation of a reciprocating broach pulling slide of the type employed on a pulldown broaching machine.

Figure 2 is a plan view of the broach gripping chuck.

Figure 3 is a section taken on the line 3—3 of Figure 2.

Figure 4 is a fragmentary diagrammatic view of the operating mechanism for the improved chuck when it is employed on a pull-up broaching machine.

The numeral 1 in Figure 1 indicates a reciprocating broach pulling slide which is mounted in any suitable or conventional manner in the ways of a pull broach machine. In accordance with conventional practice, the slide is fixed to a movable cylinder 2 which is slidable with respect to a stationary piston rod 3 through which may be supplied the operating liquid for reciprocating the cylinder 2 and, consequently, the slide 1. Since the construction and arrangement of the slide, cylinder, and piston rod may be conventional and their details of construction form no part of the present invention, they are not further illustrated or described.

The slide 1 is provided at one end with a bracket 4 projecting forwardly therefrom and adapted to support a broach gripping and pulling chuck, indicated generally at 5. As best shown in Figure 3, the chuck comprises a body portion 6 having a threaded stem 7 which is adapted to thread within an adapter sleeve 8. As best shown in Figure 1, the adapter sleeve 8 is fitted within an opening in the bracket 4 and held in position by means of a plurality of cap screws 9 extending upwardly through a flange 10 formed on the lower end of the sleeve. A lock nut 11 likewise threaded on the stem 7 acts to retain the parts against displacement. The body portion 6 is provided with a counterbore 12 which receives a cup-shaped liner 13 having a flange 14 that seats on the upper edge of the body. The body and liner are provided with four radially extending aligned holes adapted to slidably support four locking pins 15. Each of the pins is provided with a mushroom-shaped head 16 adapted to cooperate with a rotatably mounted operating sleeve 17 which surrounds the body.

As best shown in Figures 2 and 3, the inner surface of the release sleeve 17 is provided with four longitudinally extending cam grooves 18 having sloping side walls 19 which, on rotation of the sleeve, engage the mushroom heads 16 on the pins 15 and thereby cam the pins inwardly into locking position. The body is provided with countersunk recesses 20 to permit movement of the heads 16 into a position in which their outer surfaces are flush with the outer surface of the body 6. The inner ends of the pins 15 are frusto-conical in form and are adapted to engage in a correspondingly-shaped annular groove in the end of the broach which is slidably disposed in the liner 13 with its end adjacent the bottom wall of the liner so that when the sleeve 17 is in the release position shown in Figures 2 and 3, and a pulling force is exerted upon the broaching tool, the sloping sides of the groove in the shank of the tool will move the pins 15 outwardly and thus disengage the tool.

It will be noted that the cam grooves 18 in the release sleeve 17 extend the full length of the sleeve and, consequently, may be readily formed by milling or broaching operations. The joint between the sleeve 17 and the body 6 is covered and protected at one end by an annular plate 21 which is secured in position by means of cap screws 22 which extend through the plate, the flange 14 of the liner 13 and into the body, thus holding these elements in assembled relation. A similar plate 23, which is secured to the opposite end of the body by means of countersunk cap screws, indicated in dotted lines at 24, covers the joint between the body and the sleeve at the opposite end of the sleeve. As a result of this arrangement, while the sleeve is freely rotatable upon the body, no dirt or chips may enter the cam groove 18 or the joint between the sleeve and body. Accordingly, there is no danger that the mechanism will become clogged or inoperative during normal use.

In the preferred embodiment of the invention, hydraulic means are provided for positively and automatically oscillating the sleeve 17 about the axis of the body in proper timed relation to the reciprocations of the slide 1 in order to lock and unlock the broaching tool. This mechanism, as best shown in Figure 1, comprises a hydraulic cylinder 25 which is pivotally fixed to the bracket 4 and contains a piston 26 operatively connected to the locking and release sleeve 17. The connection between the cylinder and the bracket 4 comprises a lug 27 formed integrally with the end of the cylinder 25 and pivoted on a pin 28 which is carried by a block 29. Block 29 may be supported in any manner on the bracket 4 as by a bracket 30 secured to one side of the bracket 4 by means of cap screws 31.

The rod 32 of piston 26 is provided with a fork 33 pivotally connected by means of a pin 34 to a bracket 35 welded or otherwise fixed to the sleeve 17 in the manner best shown in Figure 3.

The right-hand end of the cylinder 25 is in constant communication through a suitable conduit 36 with the upper end of the cylinder 2, while the opposite end of the cylinder 25 is in constant communication through a conduit 37 with the lower end of the cylinder 2. Accordingly, when, during operation of the machine, pressure fluid is supplied to the lower end of the cylinder 2 to effect the downward broaching stroke, the fluid so supplied to the cylinder 2 will pass through conduit 37 and to the left-hand end of the cylinder 25, thus shifting the piston 26 to the right, as viewed in Figure 1, and thereby rotating the sleeve 17 in a counter-clockwise direction from the release position illustrated in Figure 2 to force the locking pins 15 radially inwardly to lock the broaching tool in the puller. It will be understood that in accordance with the usual practice such admission of pressure fluid to the lower end of the cylinder 2 will be effected, either automatically or otherwise, only after the broaching tool has been inserted in the puller 5. Since very little pressure is required to actuate the sleeve 17, the sleeve will be shifted to locking position before the cylinder 2 begins to move, and therefore the broach will be locked in the puller in proper timed relation with respect to movements of the main slide 1. It will be understood that when fluid under pressure is supplied to the lower end of the cylinder 2, the upper end will be connected to the low pressure reservoir or exhaust. Consequently, the fluid at the right-hand end of the cylinder 25 may discharge through the conduit 36.

Upon completion of the downward broaching stroke, fluid under pressure will be supplied to the upper end of cylinder 2, and the lower end of that cylinder will be connected to the low pressure reservoir. Consequently, piston 26 will then be moved to the left, as viewed in Figure 1, into the release position illustrated in the drawings. The puller 5 will thus be unlocked at the start of the return or upward movement of the slide 1, with the result that at the end of the broach return stroke, the broach may be removed from the puller by simply pulling it upwardly.

The relatively thin tubes 36 and 37 which supply the cylinder 25 are sufficiently flexible to permit the very slight movements required by the limited oscillation of cylinder 25 about pin 28.

It will be observed that the hydraulic operating mechanism so far described, while entirely suited for use on a pulldown broaching machine, would not be satisfactory if installed on a pull-up broaching machine, by reason of the fact that the pulling chuck 5 is released at the beginning of the broach return movement of the slide 1. In the case of a pull-down broaching machine, such release would permit the broach to fall out of the chuck by gravity. Accordingly, when the mechanism is employed upon a pull-up broaching machine, suitable means must be provided to delay release of the chuck until completion of the broach return movement. Such means is illustrated diagrammatically in Figure 4.

As shown in Figure 4, the main cylinder 38 of a pull-up broaching machine is movably mounted in any desired manner with respect to stationary piston 39 carried by a fixed double piston rod 40. The rod contains the fluid passages for supplying liquid under pressure to cylinder 38 at opposite sides of the piston 39 in the usual manner. A cylinder 41, which corresponds in structure and function to the cylinder 25 of the previous embodiment of the invention, is provided for actuating the broach pulling chuck, the right-hand end of the cylinder 41 being connected to the upper end of cylinder 38 by a conduit 42, and the left-hand end of cylinder 41 being connected to the lower end of cylinder 38 by a conduit 43, in which is installed a shutoff valve 44. The valve 44 is fixed to the main broaching slide which in turn is fixed to the cylinder 38 and is of such character that it normally blocks all flow through the conduit 43. However, upon depression of the valve plunger 45, open communication is provided by the valve through the conduit 43. Valve 44 is so positioned on the slide that when the slide is in its lowermost position, which it assumes at the start of the broaching stroke, the plunger 45 will have engaged a cam 46 fixed to a stationary portion of the machine 47, and the cam 46 will have depressed the plunger 45 to open the valve.

The operation of the mechanism illustrated in Figure 4 is the same as that illustrated in the remaining figures in the drawing, except that no movements of the release sleeve of the pulling chuck may occur except when valve 44 is open. Consequently, both the locking and the unlocking operations occur when the slide is at the lower end of its stroke.

It will be apparent that there is provided, in accordance with the present invention, exceedingly simple, rugged, and practical means for gripping and pulling a broaching tool, which mechanism is particularly adapted for use on automatic shuttle type pull broaching machines, Since the locking and unlocking movements of the mechanism are power actuated, there is no danger of failure due to spring failures. Moreover, the design and construction of the chuck is such that it cannot be clogged by chips or foreign material.

While only two forms of the invention are illustrated and described, it will be apparent that details of the construction may be indulged in without departing from the spirit of the invention or the scope of the appended claims.

What is claimed is:

1. A broach pulling mechanism including a slide, releasable broach gripping means carried by the slide, a motor mounted as an entirety on said slide and connected to said broach gripping means for operating the same, and means for automatically energizing said motor to cause gripping of the broach at the start of the broach pulling stroke of said slide and release of the broach after completion of the broach pulling stroke.

2. A broach pulling mechanism including a slide, a hydraulic cylinder and piston mechanism for reciprocating the slide, releasable broach gripping means carried by the slide, a second hydraulic cylinder and piston unit for operating said means, and separate fluid connections between one end of each cylinder and between the opposite ends of each cylinder to cause said second cylinder to operate in accordance with the pressures applied to the first cylinder.

3. A broach pulling mechanism for use on pull-down broaching machines including a slide, a hydraulic cylinder and piston mechanism for reciprocating the slide, releasable broach gripping means carried by the slide, a second hydraulic cylinder and piston unit for operating said means, and separate fluid connections between one end of each cylinder and between the opposite ends of each cylinder to cause said second cylinder to operate in accordance with the pressures applied to the first cylinder.

4. A broach pulling mechanism for use on pull-up broaching machines including a slide, a hydraulic cylinder and piston mechanism for reciprocating the slide, releasable broach gripping means carried by the slide, a second hydraulic cylinder and piston unit for operating said means, separate fluid connections between one end of each cylinder and between the opposite ends of each cylinder to cause said second cylinder to operate in accordance with the pressures applied to the first cylinder, and means in one of said fluid connections for blocking flow thereto except when the slide is at the lower end of its stroke.

CHARLES R. DE LORME.

REFERENCES CITED

The following references are of record in the file of this patent:

UNITED STATES PATENTS

| Number | Name | Date |
| --- | --- | --- |
| 443,775 | Libby | Dec. 30, 1890 |
| 689,658 | Spear | Dec. 24, 1901 |
| 1,341,085 | Tarhutton | May 25, 1920 |
| 1,929,593 | La Pointe | Oct. 10, 1933 |
| 2,106,213 | Halborg | Jan. 25, 1938 |
| 2,111,689 | West | Mar. 22, 1938 |
| 2,135,157 | West | Nov. 1, 1938 |
| 2,135,861 | Thompson | Nov. 8, 1938 |

FOREIGN PATENTS

| Number | Country | Date |
| --- | --- | --- |
| 146,684 | Great Britain | July 15, 1920 |